March 17, 1936.   W. D. BUMSTEAD   2,034,560
MACHINE FOR ELECTRICALLY WELDING WIRES
Filed Nov. 28, 1934   3 Sheets-Sheet 1
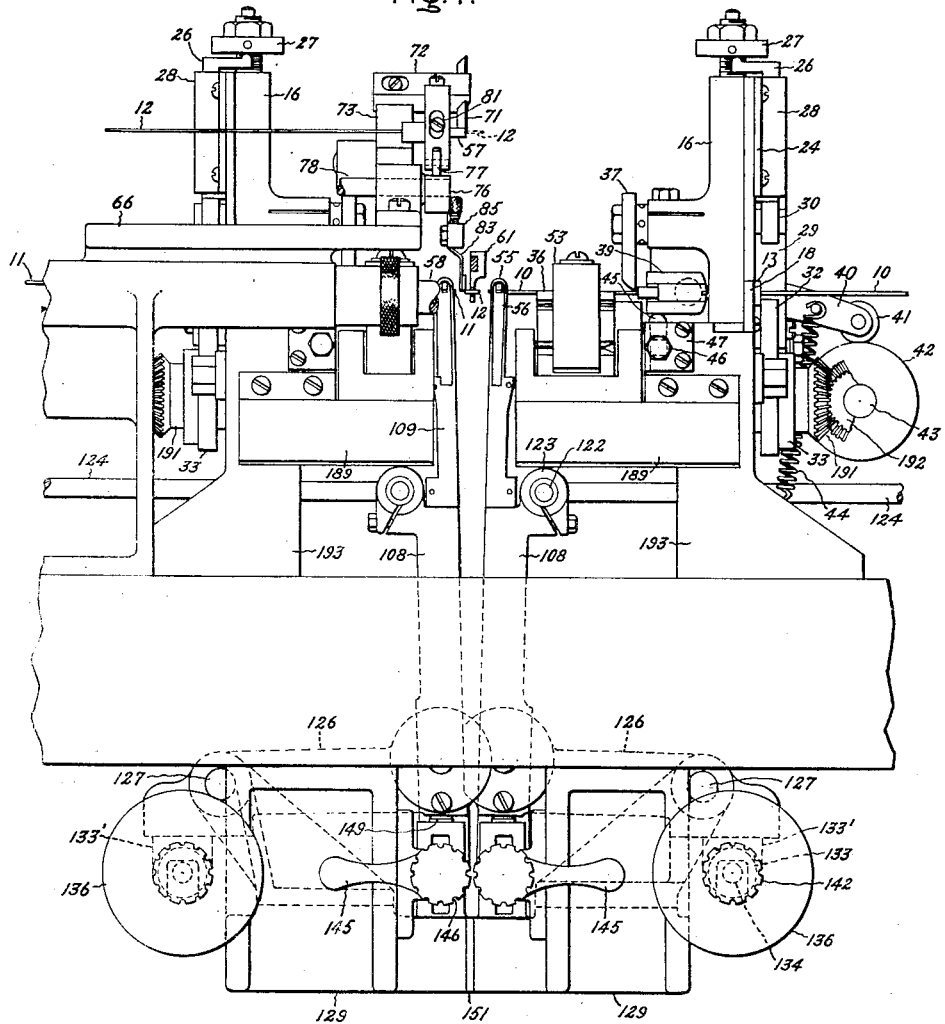
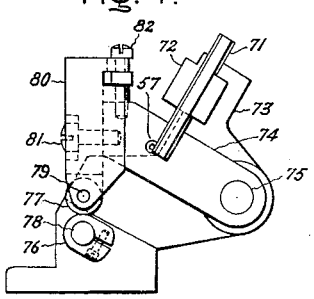
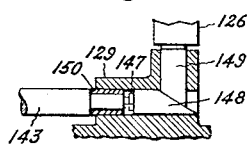
Inventor:
William D. Bumstead,
by Harry E. Dunham
His Attorney.

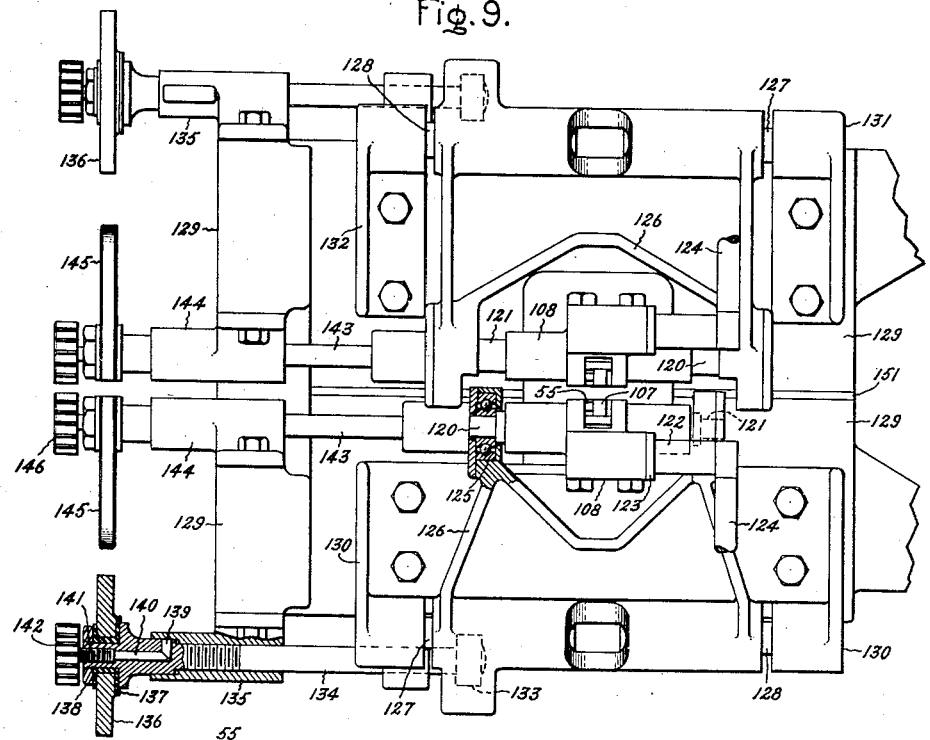

Inventor:
William D. Bumstead,
by Harry E. Dunham
His Attorney.

Patented Mar. 17, 1936

2,034,560

UNITED STATES PATENT OFFICE 2,034,560

MACHINE FOR ELECTRICALLY WELDING WIRES

William D. Bumstead, Cleveland, Ohio, assignor to General Electric Company, a corporation of New York Application November 28, 1934, Serial No. 755,125

10 Claims. (Cl. 219—4)

My invention relates to the welding of wires together in end to end relation and more particularly to machines for welding lengths of wire together in said relation. Sectional wires are very generally used in lamps, radio tubes and other similar articles, the sectional construction being to provide portions of different composition so that the wire will function properly in the portion of the article in which it is located. Because of the precision construction of these articles and machine manufacturing requirements, these wires are required to be straight and the weld therein must be of good strength, not brittle and not have excessive "knots" or "flash" thereabout. The number and composition of the sections of each wire varies considerably although a three-part wire having sections of copper wire, of a special seal wire and of nickel wire, is most generally used. One composition of seal wire very generally used tends to weather when subjected to the heat required in sealing it to the vitreous parts of the article. To protect the wire, a non-conductive coating which is absorbed by the vitreous parts of the seal is placed over the wire.

One object of my invention is to provide an automatic machine for severing lengths from a plurality of wires, for presenting said lengths in end to end relation and for welding said lengths together at a very high rate of speed. Other machines performing these operations are not adapted for such high speed operation, as the distances of travel of the mechanisms and the size and weight of parts thereof are not practicable for such operation. Another object of my invention is to provide a machine for automatically welding lengths of wire together in end to end relation and for discharging the sectional wire formed. Previous machines for welding the wires together had no means for discharging the wire formed but merely allowed it to fall from the mechanism in which it was held during the welding operation. Another object of my invention is to provide mechanism for making an electrical connection to the seal wire which is coated except for its ends with a non-conductor. Other objects and advantages of the machine of my invention will appear from the description which follows of one species thereof and from the accompanying drawings.

Figure 5:
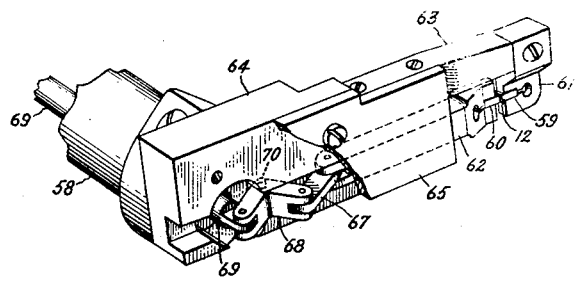
Figure 6:
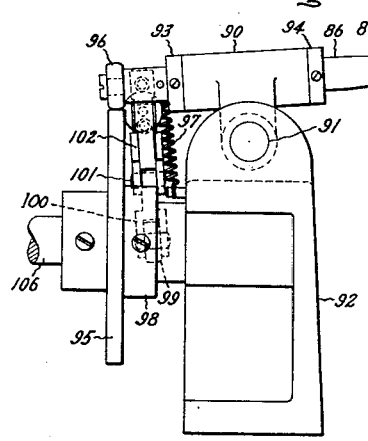
Figure 8:
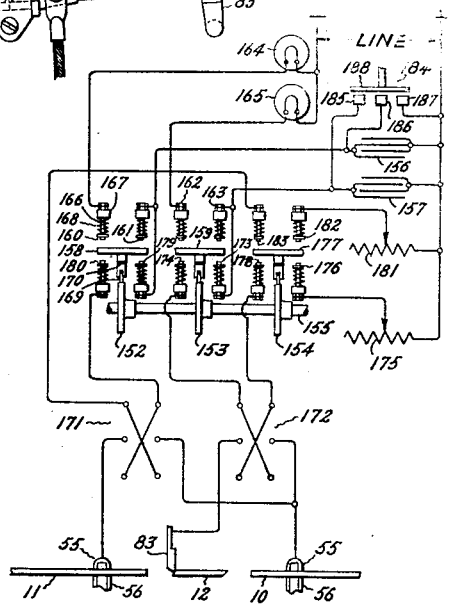
Figure 7:
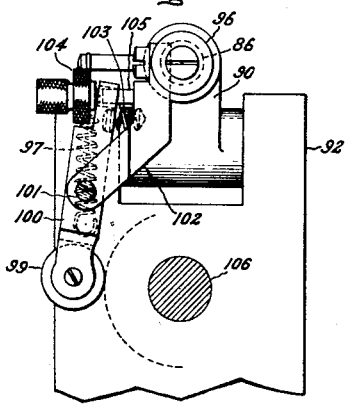

In the drawings, Fig. 1 is a side elevation of the machine of my invention; Fig. 2 is an end view of the mechanism for cutting, supporting and discharging an end length of wire; Fig. 3 is a section along lines 3—3 of Fig. 2; Fig. 4 is an end view of the seal wire cutting mechanism; Fig. 5 is a perspective view of the seal wire transferring mechanism; Fig. 6 is a side view of the seal wire contacting mechanism; Fig. 7 is an end view on an enlarged scale of said contacting mechanism; Fig. 8 is the wiring diagram of my machine; Fig. 9 is a plan view of wire advancing mechanism for both end wire sections or lengths; Fig. 10 is a perspective view, partially broken away, of a portion thereof; and Fig. 11 is a vertical section through a portion of the means for adjusting the vertical position thereof.

The machine of my invention, as shown in Fig. 1, is set up for the manufacture of leading-in wires made up of three sections or lengths of wire. The lengths are taken from wires fed intermittently by mechanism (not shown) into the mechanism of my invention, in proper time relation to the operation thereof. Suitable means for feeding the wires is shown in Patent No. 1,213,852 to Fagan et al. issued January 30, 1917, which also provides driven members to which the mechanisms of my machine may be connected for operation. The lengths forming the end sections of the leading-in wire are severed from a nickel wire 10 and a copper wire 11 which are fed into my machine from the right and left respectively. The nickel and copper wires are operated on by similar mechanisms located to each side of the device which support the lengths of wire taken from said wires in alignment with each other, although located a short distance apart. The length of wire forming the middle section of the leading-in wire is severed from a wire 12 fed into my machine from the left to mechanism above and in front of the mechanism operating with the copper wire. The length of wire taken from wire 12 is transferred to a position between the other lengths and is first welded to the nickel wire length and then to the copper wire length.

In detail, the nickel wire 10, as shown in Figs. 1, 2 and 3, passes through guide 13, between the clamping blocks 14 and 15, through the aperture in standard 16 and through the die 17. With each cycle of operation, clamping block 14 is lifted and the wire is pushed longitudinally through die 17 till a length equivalent to the end section of the leading-in wire is advanced beyond the die. Clamping block 15 is a stationary member mounted in a channel in standard 16 behind plate 18 and is supported by bolt 19 which is screwed therein and which butts against the standard. Adjustment of the position of block 15 is made by screwing bolt 19 out or in. Clamping block 14 also lies within the channel in standard 16 and is fastened by pin 20 to slide 21 which is forced downwardly by spring 22. The spring lies within an aperture in the slide and is confined between said slide and the slug 23 which is attached to the plate 24 covering the channel in standard 16 by screw 25. The clamping block 14 is raised from engagement with the wire 10 by a corresponding movement of the slide 21 which is lifted by slide 26. The slide 26 engages the disc 27 which is screwed onto an end of slide 21 and is moved vertically in the ways of block 28 by lever 29. The lever 29, which is shown in dotted lines in Fig. 2, engages the slide through roller 30 and is operated about pin 31 in the standard 16 by engagement of roller 32 with cam 33 on the driven shaft 34. The wire advanced beyond die 17, when the clamping block 14 is raised, slides into the groove in the block 35 in drum 36 and is severed from the wire by movement of said die carrying the wire against the edge of knife 37. The knife 37 is mounted on pin 38 in standard 16 whereas the die 17 is mounted in the end of pin 39 in said standard and is attached to arm 40. The movement of die 17 is caused by the passing of roller 41 of said arm 40 (Fig. 1) onto a low part of the cam 42 on the driven shaft 43. The spring 44, which extends between posts in arm 40 and a stationary part of the machine, causes the roller to follow the cam. In order that the wire may be properly aimed by the die to pass into block 35, a portion of pin 39 is caused to strike stop block 45. The position of block 45 may be adjusted by moving a wedge (not shown) below said block by turning the bolt 46, which screws into said wedge and is kept from moving by the plate 47. Block 35 is one of a plurality of blocks located in drum 36 which is fastened to washer 48 and which is mounted through engagement of said washer with the disc 49. An aperture in disc 49 fits over a protruding boss of the Geneva gear wheel 50 which is mounted on a portion of the bushing 51 extending beyond the standard 16. The washer 48, disc 49 and Geneva gear wheel 50 are clamped together so as to move with each other by the nut 48' which screws on the bolt 49' extending through the bushing 51. The wire is kept within the groove of block 35 by another block 52, mounted thereabove, which is fastened to the shoe 53 and insulated therefrom by block 54. The described mechanism and similar mechanism, provided for operation with the copper wire 11, each feeds one end of the wire introduced thereby between stud 55 and slide 56 of one arm of the wire advancing mechanism. Before other operations of these mechanisms take place, the length of wire forming the middle section of the leading-in wire is moved into position between the other lengths of wire.

The seal wire 12 passes into my machine through the aperture in die 57 and is fed to the right by mechanism (not shown) which advances a length of wire equivalent to the middle section of the leading-in wire beyond the die. This end of the wire is first gripped by the transferring mechanism shown in Fig. 5 which is mounted on shaft 58 and is then severed from the wire. The transferring mechanism comprises the blocks 59 and 60 which engage the wire as shown and are mounted in finger 61 and slide 62 respectively. The finger 61 is attached to arm 63 which is fastened to bracket 64 whereas the slide 62 is located in ways in said bracket below plate 65. Bracket 64 is attached to shaft 58 (Fig. 1) which is supported by bracket 66 and holds the mechanism in position to receive the wire as it is advanced beyond the die 57. The wire is gripped through movement of slide 62 which is connected through link 67 and lever 68 to rod 69 which is actuated in proper time relation to the other operations of my machine by mechanism (not shown). Lever 68 lies within the slide ways of bracket 64 and turns about a pin 70 supported by the bracket, and rod 69 lies within the longitudinal aperture in shaft 58 and moves longitudinally therein.

The free end of the seal wire 12 being supported, the die 57 (Figs. 1 and 4) is moved so the wire is carried against the edge of knife 71 and is severed. The knife 71 is stationary and is mounted through block 72 on the bracket 73 which is mounted on bracket 66. The die 57 is mounted in arm 74 which is attached to pin 75 and is moved by cam 76 through engagement with roller 77. The cam 76 is attached to shaft 78 which is supported by bracket 73 and is turned by mechanism (not shown). The roller 77 is attached by pin 79 to block 80 which in turn is attached to arm 74 by screw 81 and which is adapted to be moved vertically after loosening screw 81, by adjustment of screw 82. The seal wire is cut obliquely by this mechanism.

The seal wire having been severed is now carried down to a position between and in alignment with the other lengths of wire in the welding position. This movement results from movement of the transferring mechanism in which the length of seal wire is held and is produced by rotation of shaft 58, on which the transfer mechanism is located, by mechanism not shown. Electrical connection is then made to the seal wire, as shown in Fig. 1, by the contacting mechanism shown in Figs. 6 and 7. The connection is made by finger 83 which is moved into contact with the end of the wire. The edge of said finger strikes the flat end of the wire, as shown most clearly in the wiring diagram, Fig. 8, in such manner as not to injure the sharp pointed edge of the obliquely cut end thereof. The finger 83 is attached by bolt 84 to an end of arm 85 which in turn is fastened to rod 86 by the insulating bushings 87 and 88 and the collar 89 clamped thereabout. The rod 86 passes through block 90 which pivots on the pin 91 extending between portions of standard 92 and is prevented from moving longitudinally in said block by collars 93 and 94. The vertical position of the finger 83 is controlled by cam 95 which engages roller 96 in the end of rod 86 and moves the assembly against the contracting force of spring 97 which is located between posts in rod 86 and standard 92. The force with which the finger 83 contacts the wire is produced by cam 98 which is engaged by roller 99 and turns the assembly about in block 90. An opposite turning force is produced by spring 97 which holds the roller against the cam. The roller 99 is attached to lever 100 which is pivotally mounted by pin 101 in the arm 102 extending from rod 86. The force with which the finger 83 contacts the wire is controlled by spring 103 which is located between an end of said lever and said arm and permits lever 100 to turn should the force be great enough to contract the spring. When no force is applied, the lever 100 is held in position by nut 104 on the stud 105 extending from arm 102. Cams 95 and 98 are mounted on shaft 106 which is turned by mechanism not shown.

Connection having been made to the seal wire, the nickel length of wire 10 is also connected into the welding circuit and is moved so the ends of said wires contact and are welded together. Both these operations are performed by the wire advancing mechanism shown in Figs. 1, 9 and 10, and are consistent with similar operations performed with the copper length of wire 11 after the former weld is made and the seal wire contacting mechanism has been withdrawn. In each instance, the operations are performed by similar mechanisms, which are built together as a unit. In both cases the wire which is located between a stud 55 and the teeth of slide 56, as shown in Fig. 10, is clamped therebetween by movement of said slide. The stud 55 extends from arm 107, which is attached to bracket 108 and provides ways in which the slide 56 is located. The slide is confined within said ways by plate 109 and the bracket 108 and is moved by the toggle joint which comprises links 110 and 111, blocks 112 and 113 and yoke 115. Block 112 is attached to the slide 56 and block 113 is provided with a stud screwed in nut 116, the flange 117 of which is held in grooves in bracket 108. A cover plate 118 holds the blocks and nut 116 in the ways in bracket 108. Means (not shown) acting through rod 119 and yoke 115 operate the clamping mechanism. Each mechanism is connected into the welding circuit by wires (not shown) so that the engagement of the lengths of wire therewith makes the connection thereto.

After the wires have been gripped by the advancing mechanism, said mechanism is moved so the ends of the wires are brought together. The movement occurs as bracket 108 is turned about the supporting means for the studs 120 and 121 which extend from opposite sides therefrom. As shown in Fig. 9, the bracket is engaged through pin 122 and insulating washer 123 by rod 124 which swings the mechanism as required. The rod is operated by mechanism (not shown) whereas the studs 120 and 121 are each supported by a ball bearing 125 in an arm of yoke 126 which permits said movement. The yoke 126 is mounted on studs 127 and 128 about which it is adapted to be turned to raise and lower the clamping means as required with the different wire sizes used. Means are also provided for moving the yoke sidewise on said studs to line up the mechanism in this direction. The yoke supporting studs 127 and 128 of each clamping mechanism are supported by bracket 129 through bracket 130 in one case and brackets 131 and 132 in the other. The sidewise movement is produced in each case through movement of a collar 133 which is confined in a slot in the block 133' extending from the yoke and is moved back and forth as the rod 134 is screwed in and out of the bracket 135 extending from bracket 129. The rotation of rod 134 is secured by manual rotation of wheel 136 which is mounted on the insulating members 137 and which is clamped to said rod by nut 138. Means are provided for locking the rod in any position, which is comprised of the slug 139, the wedge 140, the threaded stud 141 and the knob 142. When it is desired to lock the rod 134 in position, knob 142 is turned clockwise, which screws stud 141 in and forces wedge 140 against slug 139. The slug is forced against the wall of bracket 135 preventing rod 134 from turning. The means for moving the yoke vertically is very similar to the other adjustment means, in that a rod 143 is screwed in and out of bracket 144 by manual rotation of lever 145 which is attached to said rod and duplicate means is provided for locking the rod in any position which is operated by knob 146. The inner end of the rod 143 in this case, as shown in Fig. 11, engages, through a flange 147, a wedge 148 located in an aperture in bracket 129 which moves the block 149 upon which the yoke 126 rests. Bushing 150 is slidably mounted on rod 143 and in the aperture in bracket 129. Since the mechanisms are both connected to the welding circuit, they are insulated from each other and from the machine. The former is produced by separating the halves of bracket 129 in which said mechanisms are located by the strip of insulating material 151 and the latter is produced by insulating the bracket 129 from the machine by other insulating members not shown.

The welding circuit is featured by switching means operated in proper relation to the movement of the other portions of the machine and is shown in Fig. 8. In this instance, three switches are provided which are operated by cams 152, 153 and 154 respectively. The cams are mounted on shaft 155 and as it revolves, the condensers 156 and 157 are charged since cams 152 and 153 cause bars 158 and 159 to engage contacts 160—161 and 162—163 respectively. The welding current is taken from a source of direct current electricity, the positive lead of which is connected directly to the condensers 156 and 157 and the negative lead of which is connected in one instance through the lamp 164, contact 160, bar 158 and contact 161 to condenser 156, and in the other instance through the lamp 165, contact 162, bar 159 and contact 163 to condenser 157. Each contact is mounted on a pin 166 held by a guide 167 and has between the head thereof and said guide a spring 168 which produces the contacting pressure as pin 166 is free to move longitudinally in the guide. Each of the contacting bars (158 etc.) is moved through engagement of a roller 169 with a cam on shaft 155 which it is caused to follow by a spring not shown. The bars are insulated from the roller 169 by an insulating member 170 therebetween. The condensers are now connected to the various lengths of wire so the welds are made as they are brought in contact with each other. These connections are made through the polarity reversing switches 171 and 172 which are set in one position and are not changed during the welding operation. In one arrangement, the lead from condenser 157, which was connected to the negative lead, is not connected to the nickel wire 10 through the contact 173, the bar 159 which is then in contact therewith, contact 174, the reversing switch 172 and the wire advancing mechanism. The positive lead is connected to the seal wire 12 through the variable resistance 175, contact 176, bar 177 which is then moved into engagement therewith, contact 178, reversing switch 172 and the seal wire contacting mechanism. The adjacent ends of the nickel and seal wires are brought into engagement, resulting in a weld being made therebetween. The seal wire contacting mechanism now moves away and the leads from condenser 156 are connected to the nickel and copper lengths of wire. The lead from condenser 156, which was connected to the negative lead, is now connected to the copper wire 11 through contact 179, bar 158 in contact therewith, contact 180, the reversing switch 171 and the wire advancing mechanism. The nickel wire is connected to the positive lead through the variable resistance 181, contact 182, the bar 177 then in contact therewith, contact 183, reversing switch 171 and the wire advancing mechanism. Obviously, the polarity of the mechanism may be changed as desired and the resistance members may be in more than one unit if found more desirable without passing from the scope of this invention. On stopping the machine, the condensers are short-circuited by switch 184 so that they may not be discharged accidentally or remain charged when the machine is idle. The switch comprises three blocks 185, 186 and 187, which are connected to the negative leads of condensers 156 and 157 respectively and to the positive lead, and the said switch is closed when plate 188 is in engagement with all three blocks. The switch 184 is closed after the direct current connection to the machine is broken and is closed preferably with the same manual operation.

The lengths of wire now having been welded together, the discharge of the three part sectional wire is now effected. The first step in said operation is the release of the seal wire from the transfer mechanism which then returns to a position before the cutting mechanism therefor. The second step of said operation occurs as the drums 36—36 holding the nickel and copper lengths of wire are indexed one position so as to advance another block 35 into position in each case. The sectional wire is then still trapped by shoe 53 within the grooves of the block 35 in which it is located, but repeated indexes cause it to pass from under said shoe and to be forced out by plates 189. The indexing results from engagement of Geneva gear wheel 50 with the Geneva gear 190 which is mounted on shaft 34. The shaft 34 is driven by shaft 43 through gears 191 and 192 which mesh together. Shaft 34 turns in block 193 which supports standard 16.

What I claim as new and desire to secure by Letters Patent of the United States is:

1. A machine for welding a pair of wires together in end to end relation, comprising means for supporting two wires in alignment with welding ends spaced apart, means, located adjacent the supporting means for one of the wires and on the opposite side thereof from the welding end of said wire, for severing from said wire a length to be held by its supporting means, means for connecting said length of wire and the other supported wire in an electrical circuit, and means, separate from said supporting means, engaging said length of wire for advancing it toward the other wire until the ends thereof meet and are welded together.

2. A machine for welding a pair of wires together in end to end relation comprising separate means for supporting each of said wires, at least one of said supporting means comprising a block having a groove therein adapted to receive a portion of one of said wires and support it in alignment with and with a welding end thereof spaced from the welding end of a wire held by the other supporting means, means for connecting said wires in an electrical circuit, means located adjacent the end of said block opposite from the said welding end for severing a length from said wire, means engaging the wire in the groove, after it is severed, for advancing it toward the other wire to cause the end thereof to strike the end of said other wire and to be welded thereto.

3. A machine for welding a pair of wires together in end to end relation comprising separate means for supporting each of said wires, at least one of said supporting means comprising a drum having a plurality of grooves in the periphery thereof, each adapted to support in turn a length of wire in alignment with and with an end thereof spaced from a wire held by the other supporting means, means for connecting said wires in an electrical circuit, means engaging the wire in said groove for advancing it so that ends of each of said wires contact and are welded together and means for thereafter indexing said drum to bring another groove into welding position.

4. A machine for welding a plurality of lengths of wire together in end to end relation, comprising means for supporting said wire lengths in alignment and spaced apart, means for connecting said wire lengths in an electrical circuit, means independent of said supporting means for engaging one of said wire lengths and advancing said length toward a second length of wire until ends of said lengths meet and are welded together, and separate means engaging a third wire length for advancing it until its end meets the other end of said second wire length and is welded thereto.

5. A machine for welding a plurality of wires together in end to end relation comprising means for supporting two wires in alignment and with welding ends spaced apart, means, located adjacent each of said means and on the opposite sides thereof from the welding ends of said wires, for severing from the wires the lengths to be held by their supporting means, means, located adjacent the supporting means for other wires, for severing a length from a third wire, transferring means for carrying said wire length to a position between and in alignment with the other wire lengths, means for connecting the wire lengths in an electric circuit and means independent of said supporting means for engaging each of the two outer wire lengths and advancing them toward the middle wire length until the welding ends thereof meet the respective ends of the middle wire length and are welded thereto.

6. A machine for welding a plurality of lengths of wire together in end to end relation comprising separate means for supporting each of three wires, two of said supporting means each comprising a drum having a plurality of grooves in the periphery thereof, each groove adapted to support in turn a length of wire in alignment with and with an end thereof spaced from a third wire held by the third supporting means, means for connecting said wires in an electrical circuit, means independent of and supporting means for engaging each of the wire lengths held in aligned grooves of said drums in welding position for advancing them so that an end of each contacts an end of the third wire and is welded thereto and means for thereafter indexing said drums to bring other grooves therein into the welding position.

7. A machine for welding a plurality of wires together in end to end relation comprising means for supporting three wires in alignment with the welding ends of the outer wires each separated from the adjacent end of the middle wire, means, for connecting the middle wire in an electrical circuit, comprising a finger, means for moving said finger into contact with an end of the middle wire, means for connecting the outer wire adjacent the opposite end of said middle wire in an electrical circuit and for advancing it until the welding end thereof meets said opposite end and is welded thereto, means for thereafter withdrawing said finger and means for connecting the other of said outer wires in an electrical circuit and for advancing said wire, after the finger has been withdrawn, until the welding end thereof meets the other end of the said middle wire and is welded thereto.

8. A machine for welding a plurality of wires together in end to end relation comprising means for supporting each of three wires, two of said supporting means each comprising a drum having a plurality of passages in the periphery thereof, each passage adapted to hold in turn a length of wire in alignment with and with an end thereof spaced from a wire held by the other drum, severing means located adjacent to each of said drums for cutting that length of wire in said passage from the remainder, severing means located adjacent to said supporting means for said third wire, transferring mechanism located adjacent to said severing means adapted to carry the said third wire length thus severed into position between the ends and in alignment with said other wires, means for connecting one end of said third wire length in an electrical circuit, means for gripping the length of wire adjacent to the other end of said third wire length to connect it in an electrical circuit and for moving it toward said third wire length until the ends of said wires meet and are welded together, means for gripping the remaining wire length to connect it in an electrical circuit and for moving it so that its end contacts the unwelded end of said third wire length to cause said lengths of wire to be welded together, and means for indexing said drums to remove the welded wire and to bring the next drum passages into operative positions.

9. A machine for welding a plurality of wires together in end to end relation comprising means for supporting two wires in alignment and with welding ends spaced apart, means, located adjacent to each of said supporting means and on the opposite sides thereof from the welding ends of said wires, for severing the length of each to be held by its supporting means, means, located adjacent to the supporting means for the other wires, for severing a length from a third wire, transferring means for carrying said wire length to a position between the ends and in alignment with the other wire lengths, means comprising a finger and means for moving said finger into contact with one end of said third wire length to connect said length in an electrical circuit, means for gripping the length of wire adjacent to the other end of said third wire length to connect it in an electrical circuit and for moving it toward said wire length until the ends of said wires meet and are welded together, means for gripping the remaining wire length to connect it in an electrical circuit and for moving it so that its end contacts the unwelded end of said third wire length after the aforesaid finger has been removed to cause said lengths of wire to be welded together.

10. A machine for welding a plurality of wires together in end to end relation comprising separate means for supporting each of three wires, two of said supporting means each comprising a drum having a plurality of passages in the periphery thereof, each passage adapted to hold in turn a length of a wire in alignment with and with an end thereof spaced from a wire held by the other drum, severing means located adjacent to each of said drums for cutting that length of wire in said passage from the remainder, severing means located adjacent to said supporting means for said third wire, transferring mechanism located adjacent to said severing means adapted to carry the said third wire length thus severed into position between the ends and in alignment with said other wires, means comprising a finger and means for moving said finger into contact with one end of said third wire length to connect said length in an electrical circuit, means for gripping the length of wire adjacent to the other end of said third wire length to connect it in an electrical circuit and for moving it toward said third wire length until the ends of said wires meet and are welded together, means for gripping the remaining wire length to connect it in an electrical circuit and for moving it so that its end contacts the unwelded end of said third wire length after the aforesaid finger has been removed to cause said lengths of wire to be welded together, and means for indexing said drums to remove the welded wire and to bring the next drum passages into operative positions.

WILLIAM D. BUMSTEAD.